United States Patent [19]

Franke

[11] Patent Number: 5,281,732

[45] Date of Patent: Jan. 25, 1994

[54] SOLVENT EXTRACTION OF OIL FROM OIL-BEARING MATERIALS

[75] Inventor: Henry L. Franke, Baton Rouge, La.

[73] Assignee: University Research & Marketing, Baton Rouge, La.

[21] Appl. No.: 815,700

[22] Filed: Dec. 31, 1991

[51] Int. Cl.$^5$ ............................................... C07C 1/00
[52] U.S. Cl. ........................................ 554/16; 554/2; 554/9; 554/11; 554/12; 554/20; 554/185; 554/205
[58] Field of Search ................ 554/9, 11, 16, 185, 554/209, 210, 205, 12, 20, 21, 22

[56] References Cited

U.S. PATENT DOCUMENTS

| | | | |
|---|---|---|---|
| 4,331,695 | 5/1982 | Zasel | 554/13 |
| 5,041,245 | 8/1991 | Benado | 554/20 |

*Primary Examiner*—José G. Dees
*Assistant Examiner*—Deborah D. Carr
*Attorney, Agent, or Firm*—William David Kiesel; Robert C. Tucker; Warner J. Delaune, Jr.

[57] ABSTRACT

An improved low temperature process for extracting oil from oil-bearing materials by extracting the oil-bearing material in an extraction zone with a normally gaseous solvent selected from propane, butane, and mixtures thereof. As the resulting solvent/oil mixture is passed through the bed of extracted oil-bearing material, from the extraction zone, and to a separation zone, it is done so under conditions that will maintain the solvent in liquid form. The resulting extracted materials have substantially more of their protein and vitamin value intact when compared with similar materials extracted by more conventional high temperature methods. The present process is also a lower energy consuming process than more conventional, extractive processes.

31 Claims, 1 Drawing Sheet

SOLVENT EXTRACTION OF OIL FROM OIL-BEARING MATERIALS

FIELD OF THE INVENTION

The present invention relates to the extraction of oil from oil-bearing materials, particularly plant materials, such as seeds and cereal brans, especially rice bran.

BACKGROUND OF THE INVENTION

Oils derived from plant materials, such as oil-seeds, cereal brans, fruits, beans, and nuts, are the source of raw material for many important commercial products. For example, such oils from such plant materials are extensively used in cooking, in cosmetics, as carriers for insecticides and fungicides, in lubricants, and in myriad other useful products. Consequently, much work has been done over the years in developing improved processes for extracting oil from such materials.

The most widely used process for removing oil from oil-bearing materials is solvent extraction. In solvent extraction, the oil-bearing material is treated with a suitable solvent, usually the lower carbon alkanes such a hexane, at elevated temperatures and pressures, to extract the oil from the oil-bearing material. The resulting solvent/oil mixture is then fractionated to separate the valuable oil from the solvent, which is recycled. Most solvent extraction processes in commercial use today employ hexane as the solvent. While hexane extraction is the most widely used today, there are also teachings in the art in which normally gaseous solvents are used at both supercritical and subcritical conditions.

One such teaching is found in U.S. Pat. No. 1,802,533 to Reid, wherein a normally gaseous solvent, preferably butane or isobutane, is liquefied by decreasing the temperature and/or increasing the pressure, then passing the solvent through a bed of the oil-bearing material in an extraction vessel. The solvent and extracted oil are then passed to a still where the solvent is separated from the oil. The extracted material must then be placed in another still where it is heated to remove solvent which remained entrained in the extracted material. There is no suggestion of obtaining a substantially solvent-free, dry extracted material without an additional treatment step after extraction.

Another extraction process is taught in U.S. Pat. No. 2,548,434 to Leaders wherein an oil-bearing material is introduced into the top of an extraction tower and passed counter-current to a liquefied normally gaseous solvent, such as propane, which is introduced at the bottom of the extraction tower. The tower is operated near critical conditions s that the solvent selectively rejects undesired color bodies, phosphatides, gums, etc. The resulting solvent/oil mixture can then be flashed to separate the solvent from the oil. In another embodiment, the solvent/oil mixture is first subjected to a liquid/liquid separation resulting in one fraction containing solvent and a less saturated fatty material, and another fraction containing solvent and a more saturated fatty material. The solvent is then flashed from both fractions. The extracted material remaining in the tower is drawn off and subjected to a vacuum flashing operation to remove entrained solvent.

Also, U.S. Pat. No. 4,331,695 to Zosel teaches a process for extracting fats and oils from oil-bearing animal and vegetable materials. The material is contacted with a solvent, such as propane, in the liquid phase and at a temperature below the critical temperature of the solvent to extract fat or oil from the material. The resulting solvent/oil mixture is treated to precipitate the extracted fat or oil from the solvent by heating the solvent to above the critical temperature of the solvent without taking up heat of vaporization. The extracted residue (shreds) is then treated to remove any entrained solvent, either by blowing it directly with steam, or by indirect heating followed by direct steaming.

Other references which teach solvent extraction of oil-bearing materials, with normally gaseous solvents, include U.S. Pat. No. 2,682,551 to Miller; and U.S. Pat. No. 2,560,935 to Dickinson. In each of these processes, the extracted material must be further processed to remove entrained solvent.

While prior art extraction methods, particularly hexane extraction, have met with various degrees of commercial success, there still remains a need in the art for an improved solvent extraction method which is more energy and cost efficient, and which is especially suitable for the processing of certain troublesome oil-bearing materials. One such troublesome material is rice bran, one of the most plentiful and nutritious food sources known to man, but which is greatly underutilized. This is primarily because immediately following the milling step, a lipolytic enzyme in the bran is activated which catalyzes the hydrolysis of the glyceryl esters of the free fatty acids (FFA) present in the lipids. This is measured by FFA increase, which is rapid at typical atmospheric storage conditions. These fatty acids leave the bran rancid in a matter of minutes after milling, and render it inedible to humans after several days of storage. Consequently, rice bran, as a source of oil and food, is underutilized, particularly in less developed countries. While food processors struggle to find ways to obtain a rice bran, and rice bran oil, free of these undesirable characteristics, more and more beneficial uses and nutritive values are being discovered for these products. For example, it has recently been reported that rice bran fiber is effective for lowering cholesterol in humans. As a result, a tremendous demand has been created for a process which can stabilize the rice bran after milling, or a process which will allow for the extraction of oil while at the same time stabilizing the oil and bran against further fatty acid formation.

SUMMARY OF THE INVENTION

In accordance with the present invention, there is provided a process for extracting oil from oil-bearing materials, which process comprises:

(a) introducing an oil-bearing material into an extraction zone;

(b) introducing a normally gaseous solvent into said extraction zone;

(c) providing pressures and temperatures effective for liquefying the normally gaseous solvent;

(d) passing the solvent, in liquid form, through the bed of oil-bearing material, thereby extracting oil from said material;

(e) passing the resulting oil/solvent mixture from the extraction zone to a separation zone under conditions which will maintain the solvent in liquid form as it is passed through the bed of oil-bearing material and out of the extraction zone to the separation zone;

(f) separating the solvent from the oil in the separation zone and passing the separated solvent to a storage zone from where is recycled to the extraction zone; and (f) collecting the oil and extracted material, both of which are substantially free of solvent.

In a preferred embodiment of the present invention, the solvent is selected from propane, butane, or a mixture thereof; and, the temperature of the extraction zone does not exceed the temperatures which will cause degradation of the proteins of the oil bearing material.

In another preferred embodiment of the present invention, the oil-bearing material is rice bran.

In still another preferred embodiment of the present invention, the extraction zone also contains a stabilizer for inactivating, or stabilizing, the production of free fatty acids of the rice bran.

In yet another preferred embodiment of the present invention, an inert gas is used to displace the solvent in the extraction zone as it is passed from the extraction zone to the separation zone.

In other preferred embodiments of the present invention, the stabilizer is selected from the group consisting of food grade acids, a mercaptans, and enzyme inhibitors.

BRIEF DESCRIPTION OF THE FIGURE

The sole figure hereof is a simplified schematic drawing of a preferred solvent extraction process of the present invention.

DETAILED DESCRIPTION OF THE INVENTION

Figure 1:
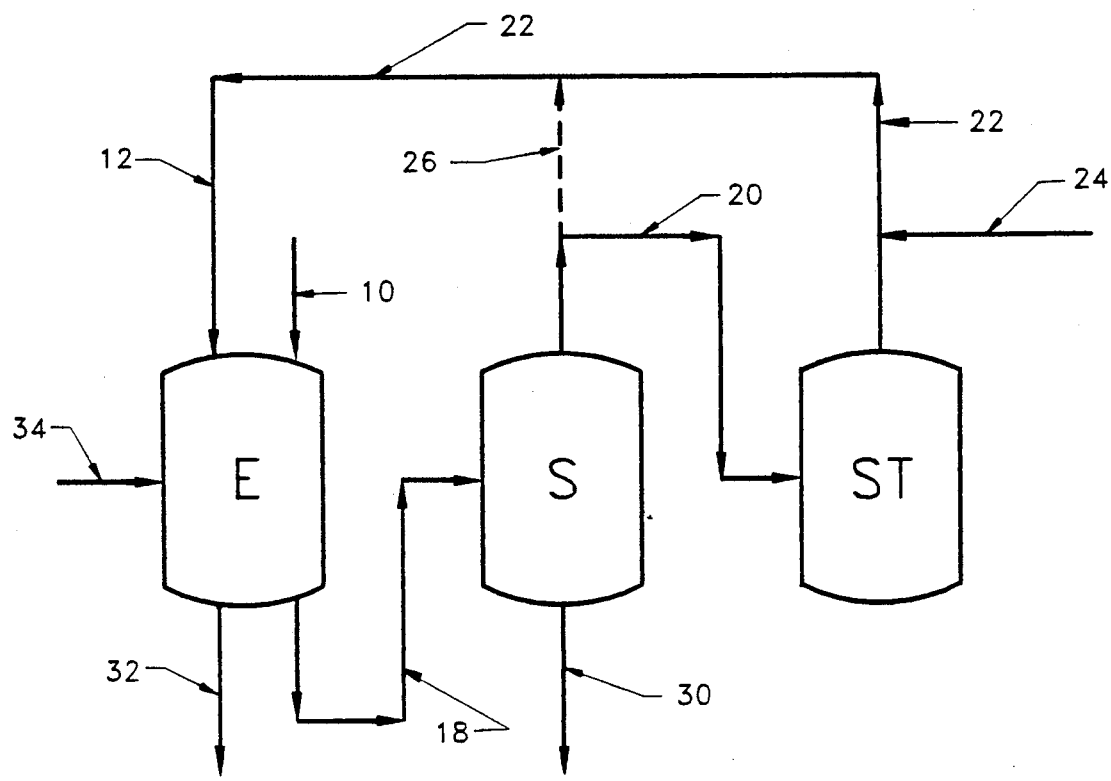

Any oil-bearing vegetable and animal material can be extracted by the practice of the present invention. Non-limiting examples of such vegetable, or plant materials, include soybeans, cottonseed, linseed, and cereals such as rice bran, wheat bran, and corn meal. It is preferred to use a cereal bran, particularly rice bran.

Solvents suitable for use in the present invention are any solvent which is normally a liquid at extraction conditions, such as hexane, or which can be converted to a liquid at extraction conditions. Preferred solvents are those which are normally gaseous at typical atmospheric conditions. That is those which are a gas at about room temperature (about 70° F.) and atmospheric pressure. Non-limiting examples of preferred solvents include methane, ethane, propane, butane, ethylene, propylene, butylene, sulfur dioxide, carbon dioxide, $CHF_3$, $CClF_3$, $CFBr_3$, $CF_2=CH_2$, $CF_3-CF_2-CF_3$, $CF_4$, $CF_4$, $CH_3-CF_3$, $CHCl_2$, ammonia, nitrogen, dichlorodifluor methane, dimethylether, methyl fluoride, and halogenated hydrocarbons which are normally gaseous as indicated. Preferred are propane, butane, and mixtures thereof; and, more preferred is propane. The weight ratio of solvent to oil-bearing material will be from about 1:1 to 2:1, preferably from about 1 2:1 to 1.5:1. A co-solvent, such as a $C_2$ to $C_6$ alcohol, preferably ethanol, may be used. If a co-solvent is used it may be used in place of at least about 5 to 90 vol. %, preferably about 5 to 50 vol. %, and more preferably from about 5 to 25 vol. %, of the primary solvent.

Referring now to the Figure, oil-bearing material is introduced into extraction zone E via line 10. The extraction zone can be comprised of one or more vessels suitable for the volumes, temperatures, and pressures employed. For purposes of the Figure, only one vessel is shown, but in actual practice it would be preferred to use two or more vessels. In this way, while a vessel has undergone extraction and is being unloaded, another vessel can be loaded with the oil-bearing material to continue the extraction process. This would represent a continuous type of operation. Unlimiting types of vessels which may be used in the extraction zone include fixed-bed, slurry-bed, moving-bed, as well as reactors in which the oil-bearing material is fed therethrough on a belt or with a screw. It is preferred that the vessel be one in which a fixed-bed of oil-bearing material can be loaded. It is preferred to evacuate the vessels of the extraction zone prior to the introduction of solvent, especially if the solvent is propane which may form an explosive mixture with air. The evacuation can be conducted in any suitable manner, such as, by use of a vacuum pump or by merely venting the air a it is displaced by the solvent during solvent loading. Of course any propane which contaminates the vented air can be separated by membranes, etc. or burned-off as a heat source during venting. It is also within the scope of the present invention that the extraction zone be flushed with inert gas prior to introduction of the solvent. That is, by displacing the air in the extraction zone with the inert gas. It is preferred that the inert gas be at elevated temperatures, for example at a temperature from about 80° to 140° F., preferably from about 80° to 120° F. This hot inert gas flush will act as evacuating the extraction zone of air as well as heating, or drying, the oil-bearing material.

It is preferred that the oil-bearing material be dry before being contacted with the solvent to mitigate any freezing which may occur during the process. While the hot inert gas can be used to dry the oil-bearing material, it may also dried by any other appropriate means, such as by heating it by conventional means, including the use of microwaves. Furthermore, after flushing the extraction zone with inert gas, the inert gas can be used to pressurize the extraction zone so that when the normally gaseous solvent is introduced into the extraction zone it is immediately transformed to the liquid state.

Returning to the Figure, the normally gaseous solvent is fed into the extraction zone via line 12 in the vapor state, whereupon an effective pressure and temperature which will cause the normally gaseous solvent to liquefy. It is also within the scope of this invention that the normally gaseous solvent be introduced into the extraction zone already in a liquid state. The inert gas can also be used to pressurize the extraction zone so that as the normally gaseous solvent enters the extraction zone, it is converted to its liquid form. Typically, the extraction temperature will be from about ambient temperature, up to, but not including, the temperature at which degradation, or denaturing, of the proteins of the oil-bearing material is initiated. It is also desirable to protect the vitamins against degradation. This temperature will typically range from about ambient temperature to about 140° F., preferably from about 60° F. to 130° F., more preferably from about 70° F. to 120° F., most preferably from about 70° F. to about 110° F. It is Within the scope of this invention to operate the extraction zone at a temperature which will leave any substances such as gums and waxes in the extracted oil-bearing material. Such a temperature will typically be less than about 80° F. at about atmospheric pressure. Of course, the temperature may vary somewhat at different pressures. Of course, these temperatures may vary for any given oil-bearing material and solvent combination, and the precise conditions are within the skill of those in the art given the teaching herein. These are the preferred conditions when the oil-bearing material is rice bran and the solvent is propane. The important feature is that the temperature not be so high that the proteins and vitamins of the oil-bearing material are destroyed. The pressure maintained in the extraction zone will be a pressure which is effective for maintaining the solvent as a liquid. While this pressure will be dependent on such things as the particular solvent and temperature employed, it will typically range from less than atmospheric pressures to about 200 psig, preferably from about 15 psig to 200 psig, more preferably from about 100 psig to 140 psig, when a solvent such as propane is used.

The extraction zone can also be subjected to conditions which will repeatedly stress and relax the oil and/or solvent molecules. Such stressing and relaxation can be caused by fluctuating the pressure of the extraction zone by at least about ¼ psig, preferably by at least about ½ psig, more preferably by at least 1 psig, and most preferably by at least 5 psig. This pressure fluctuation can be caused by actuating and deactuating a piston or diaphragm in the pressure or solvent line. The stressing and relaxation conditions can also be caused by sonication. That is, by subjecting the ingredients of the extraction zone to sonic energy.

The extraction can also be accomplished in more than one extractions. That is, the oil-bearing material can undergo several extractions with fresh solvent in order to assure more complete removal of oil. One method in which this can be achieved is by treating the oil-bearing material with additional solvent after it has been treated with a first pre-determined amount of solvent and the first solvent and the extracted oil have been removed from the extraction zone. For example, a first extraction may leave as much as about 1 to 3 vol. % of the oil in the material which weight percent is based on the total weight of the extracted material. A substantial amount of this residual oil can then be removed by subjecting the oil-bearing material to at least one other extraction with fresh solvent. It is preferred that less than about 1 wt. %, more preferably less than about 0.1 wt. % of the extracted material represent that residual oil fraction. Of course, the economics of the process must be considered so that the cost of additional extractions does not exceed the value of the added products from the additional extractions.

The oil-bearing material preferably sits on a filtering means, such as a screen, or membrane filter, or perforated tray (not shown), wherein the solvent passes there-through with the extracted oil. It is understood that an alternative process feature is one wherein the filtering means is situated between the extraction zone and the separation zone. The solvent is maintained in contact with the oil-bearing material for an effective period of time. That is, for a period of time which will result in the extraction of a predetermined amount of oil. Of course, if too much oil still remains in the oil-bearing material after extraction, it may be subjected to one or more additional extraction cycles or the extraction time extended according to the condition of the oil-bearing material feedstock.

The solvent/oil mixture is passed from the extraction zone via line 18 to separation Zone S under conditions which will maintain the solvent as a liquid. It is important that the pressure be maintained in the extraction zone during removal of the solvent and oil so as to prevent unnecessary evaporation of solvent during removal which may result in freezing of the extracted material. A preferred method of maintaining the pressure in the extraction zone during removal of solvent and oil is to introduce an inert gas, such as nitrogen, into the extraction zone to replace the leaving solvent/oil mixture. By "inert gas" is meant a gas which will not cause a deleterious reaction of the extracted oil or extracted material. The preferred inert gas is nitrogen and carbon dioxide. More preferred is nitrogen. The gas replaces the solvent/oil mixture in the extraction zone and maintains substantially the same pressure throughout the solvent/oil removal step. This helps prevent freezing of the extracted material. It is preferred that the inert gas which is introduced into the extraction zone to displace the solvent/oil mixture be heated. That is, that it be at a temperature from about 90° F. to 140° F., preferably at a temperature from about 100° F. to 120° F. This heated inert gas can enhance the recovery of any residual oil and solvent left in the extracted material. It is also within the scope of this invention that solvent vapor be passed through the de-oiled material either in place of the inert gas or following the passage of inert gas. This solvent vapor will act to remove at least a portion of the residual oil left in the de-oiled material.

The separation zone is run under conditions which will enhance the separation of solvent from the oil. It is preferred that heat be applied preferably from heated solvent or inert gas, to enhance this separation. Other conditions for operating the separation zone to enhance solvent/oil separation include distillation, centrifugation, the use of membranes and reduced pressures. The separated solvent is then passed, via line 20, to storage zone ST where it can be recycled via line 22 to the extraction zone. Makeup solvent, if needed, can be added via line 24. At least a portion of the recovered solvent may also be recycled directly to the extraction zone via line 26. It is also within the scope of the present invention that the separation be conducted in more than one vessel. For example, the solvent/oil mixture may first be subjected to a first separator vessel wherein a liquid/liquid separation occurs. That is, the separation vessel is under enough pressure so that the solvent will not vaporize. The liquid solvent is separated from the oil phase. The liquid solvent fraction is then introduced into a second separation vessel wherein a liquid/vapor separation occurs. That is, the solvent is vaporized and collected in a storage vessel and any residual oil fraction is separately collected. This second vessel will typically be smaller than the first and may include the use of a vacuum to aid in the vaporization of the solvent.

If gums and waxes are present in the extracted oil fraction, they may be solidified out of the oil by cooling. The cooling can be provided by use of the vaporized solvent which will still be cool owing to the vaporization step.

The substantially solvent-free oil is collected via line 30. The de-oiled oil-bearing material can be collected from the extraction zone by any appropriate means. To facilitate the collection of the de-oiled oil-bearing material the screen may be first removed or additional pressure could be applied to force the de-oiled oil-bearing material through the screen. For purposes of simplification, the de-oiled material is shown in the Figure as being collected via line 32. An important feature of this invention is that the resulting extracted, or de-oiled material is substantially lighter and drier than if produced by conventional processes which use hexane and/or steam. The resulting products also have a more pleasant taste.

In those situations where the oil-bearing material is one which is unstable because of the production of fatty acids, such as rice bran, a stabilizing agent can be added to the extraction zone via line 34. Any appropriate means can be used to add the stabilizing agent. That is, it can be sprayed directly onto the oil-bearing material prior to the material being introduced into the extraction zone. It can also be introduced into the extraction zone either directly, (as shown in the figure) or in combination with the solvent. Rice bran, the preferred oil-bearing material, upon milling, activates lipolytic enzymes which catalyze the production of free fatty acids. These free fatty acids cause the bran to become rancid. Non-limiting examples of stabilizers which can be used to stabilize rice bran include an inert gas such as nitrogen, food grade acids and alcohols, preferably ethanol, mercaptans, and enzyme inhibitors. Preferred are food grade acids and alcohols, non-limiting examples of which include citric acid, ascorbic acid, lactic acid, gluconic acid, malic acid, ethanol and the like. More preferred are citric acid and ascorbic acid, with ascorbic acid being most preferred.

The rice bran which results from the preferred embodiment of the present invention is unique in the industry in commercial quantities. That is, not only are the fatty acids stabilized, but deleterious ingredients which contribute to poor taste are also absent. Furthermore, the rice bran of the present invention also contains more cyanocobalamin (vitamin B-12) then an identical bran which has been extracted by use of a conventional hexane extraction process. Consequently, the rice bran produced in accordance with the present invention fills a long felt need in the art. Therefore, the production of a rice bran which is desirable from a taste point of view, is highly desirable.

What is claimed is;

1. A process for extracting oil from oil-bearing materials, which process comprises:
   (a) introducing an oil-bearing material into an extraction zone;
   (b) removing air from said extraction zone;
   (c) introducing a normally gaseous solvent into said extraction zone;
   (d) providing a pressure and a temperature in said extraction zone which is effective for maintaining the normally gaseous solvent in a liquid phase;
   (e) passing said normally gaseous solvent through the bed of oil-bearing material in a manner to extract oil from said material;
   (f) introducing an inert gas into said extraction zone in a manner to displace said normally gaseous solvent and extracted oil from said extraction zone while maintaining temperatures and pressures in said extraction zone which are effective for maintaining said normally gaseous solvent in a liquid phase;
   (g) passing said displaced extracted oil and said normally gaseous solvent to a separation zone under temperature and pressure conditions which will maintain said normally gaseous solvent in liquid phase;
   (h) separating said normally gaseous solvent from said extracted oil in said separation zone; and
   (i) collecting said extracted oil.

2. A process for extracting oil from oil-bearing materials according to claim 1 wherein said inert gas is nitrogen or carbon-dioxide.

3. A process for extracting oil from oil-bearing materials, which process comprises:
   (a) introducing an oil-bearing material into an extraction zone;
   (b) removing air from said extraction zone;
   (c) introducing a normally gaseous solvent into said extraction zone:
   (d) providing a pressure and a temperature in said extraction zone which is effective for maintaining the normally gaseous solvent in a liquid phase;
   (e) passing said normally gaseous solvent through the bed of oil-bearing material in a manner to extract oil from said material, wherein said normally gaseous solvent is periodically stressed during its passage through said oil-bearing material;
   (f) passing said displaced extracted oil and said normally gaseous solvent to a separation zone under temperature and pressure conditions which will maintain said normally gaseous solvent in liquid phase;
   (g) separating said normally gaseous solvent from said extracted oil in said separation zone; and
   (h) collecting said extracted oil.

4. A process of claim 3 wherein sad normally gaseous solvent is periodically stressed by fluctuating said pressure in said extraction zone by at least 0.25 psig.

5. A process for extracting oil from oil-bearing materials, which process comprises:
   (a) introducing an oil-bearing material into an extraction zone;
   (b) removing air from the extraction zone;
   (c) introducing a normally gaseous solvent into the extraction zone;
   (d) providing a pressure between 0.–200 psig and a temperature between 60°–130° F. in said extraction zone which is effective for maintaining the normally gaseous solvent in a liquid phase;
   (e) passing the normally gaseous solvent through the oil from the oil-bearing material thereby extracting oil from the oil-bearing material to from an oil-extracted material and extracted oil;
   (f) passing the extracted oil and the normally gaseous solvent from the extraction zone to a separation zone under conditions which will maintain the normally gaseous solvent in a liquid phase as the normally gaseous solvent is passed through the oil-bearing material, out of the extraction zone, and to the separation zone;
   (g) separating the normally gaseous solvent from the extracted oil in the separation zone and passing the normally gaseous solvent to a storage zone; and
   (h) collecting the extracted oil and the oil-extracted material, both of which are substantially free of the normally gaseous solvent.

6. The process of claim 5, wherein the normally gaseous solvent is selected from ethane, propane, butane, ammonia, dichlorodifluor methane, dimethyether, methylfluoride, and halogenated hydrocarbons which are normally gaseous.

7. The process of claim 6 wherein the normally gaseous solvent is selected from propane, butane, and mixtures thereof.

8. The process of claim 7 wherein the normally gaseous solvent is propane.

9. The process of claim 8 wherein the normally gaseous solvent is passed from the extraction zone to the separation zone by introducing inert gas into the extraction zone thereby displaying the normally gaseous solvent at substantially the same temperature and pressure as the normally gaseous solvent passes through the oil-bearing material and out of the extraction zone.

10. The process of claim 5 wherein the molecules of the mixture in the extraction zone are periodically stressed during extraction.

11. The process of claim 10 wherein the molecules are stressed by fluctuating the pressure by at least 1/4 psig.

12. The process of claim 10 wherein the molecules are stressed by sonication.

13. The process of claim 5 wherein the normally gaseous solvent is passed from the extraction zone to the separation zone by introducing nitrogen into the extraction zone thereby displacing the normally gaseous solvent at substantially the same temperature and pressure as the normally gaseous solvent passes through the oil-bearing material and out of the extraction zone.

14. The process of claim 5 wherein the oil-bearing material sits on a filtering screen which allows the passage of normally gaseous solvent and oil, but not the material itself.

15. The process of claim 14 wherein the filtering screen is situated between the extraction zone and the separation zone.

16. The process of claim 5 wherein the air is removed from the extraction zone by flushing the zone with nitrogen.

17. The process of claim 16 wherein after flushing the extraction zone with nitrogen, the extraction zone is pressurized with nitrogen to a pressure which will cause the normally gaseous solvent to be converted to a liquid as it enters the extraction zone.

18. A process for extracting oil for rice bran, which process comprises:
(a) introducing rice bran into an extraction zone;
(b) removing air from the extraction zone;
(c) introducing a normally gaseous solvent selected from propane, butane, and mixtures thereof, into the extraction zone;
(d) providing a pressure which is effective for maintaining the normally gaseous solvent in liquid form;
(e) providing a temperature up to, but not including, the temperature at which denaturing of the proteins or vitamins of the rice bran occurs;
(f) pass the normally gaseous solvent through the bed of oil-bearing material, thereby extracting oil from the material;
(g) passing the resulting oil/solvent mixture from the extraction zone to a separation zone under conditions which will maintain the normally gaseous solvent in liquid form as it is passed through the bed of oil-bearing material, out of the extraction zone, and to the separation zone;
(h) separating the normally gaseous solvent from the oil in a separation zone and passing the separated normally gaseous solvent to a storage zone wherein it can be recycled to the extraction zone; and
(i) collecting the oil and extracted rice bran, both of which are substantially free of solvent.

19. The process of claim 18 wherein the normally gaseous solvent is passed from the extraction zone to the separation zone by introducing nitrogen into the extraction zone thereby displacing the normally gaseous solvent at substantially the same temperature and pressure as the normally gaseous solvent passes through the oil-bearing material and out of the extraction zone.

20. The process of claim 19 wherein an effective amount of stabilizer is added to the extraction zone with the solvent and oil-bearing material to stabilize the production of free fatty acids.

21. The process of claim 20 wherein the stabilizer is selected from food grade acids, alcohols, mercaptans, and enzyme inhibitors.

22. The process of claim 21 wherein the stabilizer is a good grade acid.

23. The process of claim 22 wherein the food grade acid is selected from one or both of citric acid and ascorbic acid.

24. The process of claim 5 wherein the temperature during extraction is from about 60° F. to 140° F.

25. The process of claim 24 wherein the temperature during extraction is from about 60° F. to 110° F.

26. The process of claim 18 wherein the air is removed from the extraction zone by flushing the zone with nitrogen.

27. The process of claim 26 wherein the nitrogen which is used to flush the air from the extraction zone is at a temperature up to about 140° F., thereby flushing the extraction zone of air and drying the rice bran.

28. the process of claim 26, wherein after flushing, nitrogen is used to pressurize the vessel to a pressure effective to convert the normally gaseous solvent to a liquid as it enters the extraction zone.

29. The process of claim 18 wherein the rice bran is subjected to multiple extractions with fresh normally gaseous solvent.

30. The process of claim 6 wherein from about 5 to 90 vol. %, based on the total amount of normally gaseous solvent, of a co-solvent is used, which co-solvent is selected from the $C_2$ to $C_6$ alcohols.

31. The process of claim 20 wherein from about 5 to 90 vol. %, based on the total amount of normally gaseous solvent, of a co-solvent is used, which co-solvent is selected from the $C_2$ to $C_6$ alcohols.

* * * * *